Aug. 13, 1957  G. J. FEDERIGHI ET AL  2,802,228
DRINKING GLASS BURNISHING AND WASHING MACHINE
Filed April 14, 1953  2 Sheets-Sheet 1
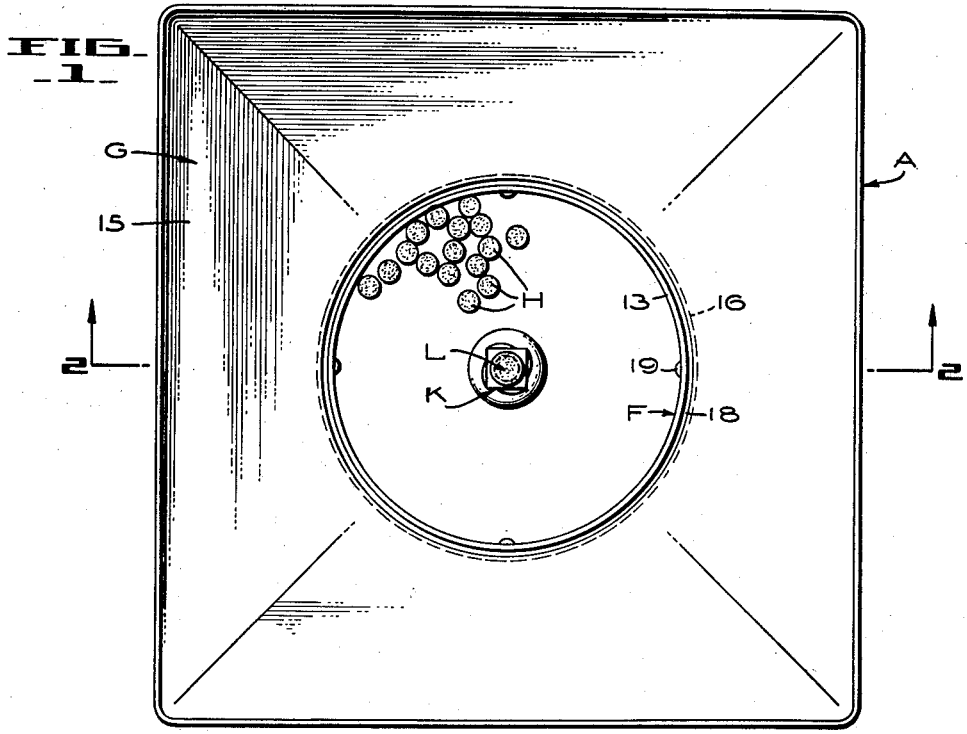
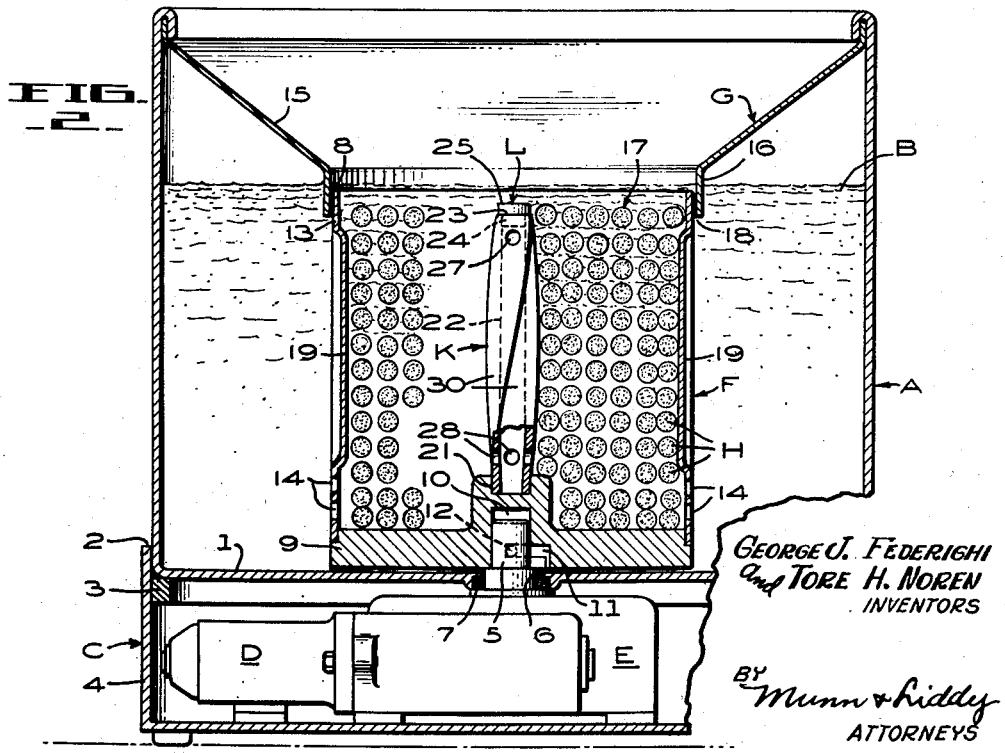
GEORGE J. FEDERIGHI
and TORE H. NOREN
INVENTORS
BY Munn & Liddy
ATTORNEYS

GEORGE J. FEDERIGHI
TORE H. NOREN
INVENTORS

2,802,228
DRINKING GLASS BURNISHING AND WASHING MACHINE

George J. Federighi and Tore H. Noren, San Francisco, Calif.

Application April 14, 1953, Serial No. 348,742

5 Claims. (Cl. 15—95)

In drinking glass washing machines of which we are aware, the glass washing unit usually comprises a cup-shaped drum that revolves about a vertical axis at a speed of approximately 400 revolutions per minute. An upstanding center brush is positioned at the axis of the drum and three side brushes are placed at the inner surface of the cylindrical portion of the drum and are spaced equal distances from each other. The glass to be cleaned is inverted and moved downwardly over the central brush and the side brushes contact with the outer glass surface. The brushes rotate with the drum. There is a forced circulation of washing water into the interior of the glass and around the exterior glass surface while the brushes perform their scrubbing operation.

There are several disadvantages to this type of drinking glass washing machine. In the first place, the bristles of the brushes will conform to the curvature of the glass wall and if a number of the same type of glasses are washed in succession, the bristles will take on a certain shape to wash this type of glass and will tend to become permanently set in this position. Therefore, the bristles will not be quick to alter their shape when another type of glass of a different shape is washed. The result will be an inferior washing operation on the altered type of glass and the glass will not be thoroughly cleaned. The brushes have a relatively short life and it is expensive to keep renewing them from time to time.

In the second place, the high speed of about 400 R. P. M. of the cup-shaped drum, prevents an operator from placing his hand in contact with the side brushes because they are revolving too rapidly. Some machines now on the market are provided with a rubber hand and glass guard which is placed at the top of the rotating drum and shields the side brushes from the operator's fingers. The operator holds the inverted glass with the fingers and these must grip the outer glass surface an appreciable distance along its length from the bottom in order to control the movement of the glass and hold it from being rotated by the side brushes. At least ¾" is required along the glass side from the bottom to grip it and this portion cannot be scrubbed because the side brushes will not reach it.

In the third place, the outer walls of the glasses will become scratched with a myriad of hair-like scratches during use and this is caused by the glasses contacting each other in the trays that are used to carry the glasses to and from the washing machine. These fine scratches criss-cross each other and produce a milky or whitish appearance in the glass walls and the glasses when thus scratched will not appear clean even though they have been just washed. It is frequently necessary for the proprietor to throw away good glasses that would otherwise be useable just because the hair-like scratches have increased to a point where the glass appears permanently dirty. Lime deposits from the washing water will enter and remain in these scratches and the brushes cannot remove these deposits.

In the fourth place, the drinking glass washing machines of which we are aware, cannot wash cups that have handles, such as the usual coffee or tea cup. The handle on the cup would interfere with the side brushes that are rotated with the drum.

An object of our invention is to provide a drinking glass washing machine in which a large number of small rubber balls are used for rubbing against the inner and outer surfaces of the glass for cleaning it. These balls are used in place of the brushes. The cup-shaped drum can rotate at a much slower speed of 100 R. P. M. instead of the higher 400 R. P. M., and the washing effect will be better because the balls are small in size and will be forced against all surfaces of the glass regardless of its curvature. Glasses of different shapes will be washed just as effectively as glasses of the same shape because the balls will flow and will readily conform to any interior or exterior surface shapes of the glasses. The rubber balls have a long life since they are preferably made of a synthetic rubber known as neoprene, and they can be used until they actually disappear because smaller balls are just as effective in cleaning the glasses as are the larger ones.

Novel means in the form of a central rotating spindle with an auger groove in its outer surface, is used for forcing the balls into the glass interior and up to the inside bottom of the glass for washing the entire inner glass surface. In addition, this spindle is made hollow chines of which we are aware are provided with an air pressure within the inverted glass as the glass is moved downwardly into the mass of balls that are disposed in the cup-shaped drum. Some of the glass washing machines of which we are aware are provided with an air eliminator that will draw out the pocketed air from inside the glass. Our device does not require an air suction device for this purpose. The auger-like grooves on the exterior surface of the spindle force the balls upwardly into the glass interior for cleaning purposes.

We have found that the greatly reduced speed of 100 R. P. M. instead of the high speed of 400 R. P. M., will permit the operator to move the entire glass into the mass of balls without the moving balls caused by the rotating drum doing any damage to the fingers that hold the glass. The entire outer glass surface is therefore thoroughly washed from top to bottom. No rubber hand and glass guard need be used.

The neoprene rubber balls will have a burnishing effect on the glasses which will remove the scratches on the inner and outer glass surfaces. The glasses will therefore always remain clear and no lime deposits can be retained on the glass surfaces. There will be no need to throw away glasses because of a soiled look produced by scratches that have accumulated lime deposits.

Our device can wash cups just as effectively as glasses of any shape. The entire cup can be submerged in the mass of balls and washing fluid after the cup has been inverted. The balls will simply move around the submerged cup handle and will clean it also. The drum that holds the balls will have its cylindrical inner surface provided with inwardly extending ribs that will cause the balls to rotate about the object being cleaned and will also urge the balls against the outer surface of the object to increase the cleaning effect.

Other objects and advantages will appear in the following specification, and the novel features of the device will be particularly pointed out in the appended claims.

Our invention is illustrated in the accompanying drawings forming a part of this application, in which:

Figure 1 is a top plan view of the device;

Figure 2 is a vertical section taken substantially along the line 2—2 of Figure 1.

Figure 3:
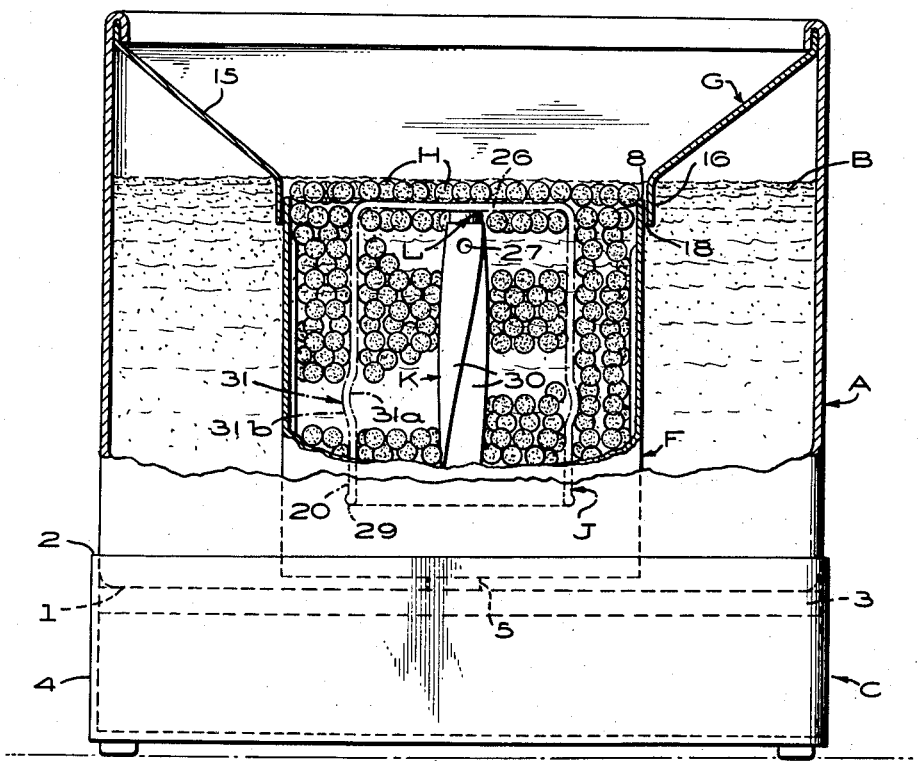
Figure 3 is a view somewhat the same as Figure 2 and shows an inverted drinking glass placed in the device for cleaning purposes.

While we have shown only the preferred form of our invention, it should be understood that various changes or modifications may be made within the scope of the appended claims without departing from the spirit and scope of the invention.

In carrying out our invention, we provide a tank indicated generally at A and adapted to hold a glass-washing solution indicated generally at B. The glass washing solution may be hot water with a detergent dissolved therein. Although we have shown no means for adding water to the tank or draining water therefrom, it is obvious that such means may be provided and this of course forms no part of our present invention.

The tank A has its bottom 1 removably received within a base C. The base has an open top 2 and a supporting ring 3 is secured to the inner surface of the peripheral wall 4 of the base. The bottom 1 of the tank rests on the ring and the portion of the wall 4 projecting above the ring, holds the tank in place. Again we do not wish to be confined to this exact structure since the tank A and base C can be made as a single unit or in any other way if desired.

In the hollow base C, we mount a motor D and this motor is operably connected to a gear reducing mechanism indicated generally at E. A vertically-extending stub shaft 5 is rotated by the gear reducing mechanism E. In the present form of the invention the motor is designed to operate at 1700 R. P. M., while the shaft 5 will rotate at 100 R. P. M. The shaft rotates about a vertical axis and it extends through an opening 6 in the tank bottom 1. A liquid seal 7 prevents the washing solution B in the tank from passing into the hollow base C while still permitting the shaft to rotate.

We provide a cup-shaped drum indicated generally at F and this drum has an open top 8. The level of the washing solution B is preferably ¾" above the drum top. The wall of the drum is preferably cylindrical in shape and the lower end of the wall is closed by a disc-shaped base 9. The base has a socket 10 therein for receiving the top of the shaft 5. The stub shaft enters the disc-shaped base 9 about one inch. A bayonet slot 11 is formed in the wall of the socket 10 and a pin 12, carried by the stub shaft 5, is removably received in the bayonet slot. The structure permits the cup-shaped drum or basket to be removed from the tank A at any time desired. The drum can be quickly reattached to the stub shaft to rotate therewith. The measurements given are by way of example only, and may be altered if desired.

It will be noted from Figure 2 that about one inch in height of the portion of the cylindrical wall 13 of the drum, disposed nearest the disc-shaped base 9, is perforated at 14 for permitting the glass washing solution B to flow into and out of the drum or basket at will. The openings are preferably 3/16" in diameter and spaced ½" apart.

A cover G is provided for the top of the tank A and this cover may be secured to the tank in any manner desired. The cover has downwardly inclined portions 15 that extend from the top sides of the tank A to a downwardly-extending circular flange 16. The inner diameter of the flange 16 is slightly larger than the outer diameter of the circular wall 13 of the drum F so that the glass washing solution B can pass between these two members when necessary. It will also be noted from Figures 2 and 3 that the flange 16 telescopes the top 8 of the drum F for a short distance.

One of the novel features of our invention is the provision of a plurality of glass-cleaning objects indicated generally at H which are loosely placed in the drum F and substantially fill it. The top row of the objects H is indicated at 17 in Figure 2 when no glass is placed within the drum for cleaning purposes. When a drinking glass J is inverted and inserted into the drum F, as clearly shown in Figure 3 for washing and polishing purposes, the glass cleaning objects H will be raised to a higher level than that shown in Figure 2, and in fact will tend to spill over the top rim 8 of the drum. The objects are too large to pass through the annular space 18 formed between the flange 16 and the drum top 8.

In Figure 1 we show the cylindrical wall 13 of the drum or basket F provided with inwardly and longitudinally extending ribs 19 which may be of any size desired. These ribs are for the purpose of rotating the glass cleaning objects H with the drum or basket and for forcing these objects inwardly against the outer surface 20 of the glass. The objects are preferably spherical in shape and are made of yielding material such as rubber or neoprene, and are about ⅜" in diameter. The objects may be of any diameter desired or any shape. The objects should be larger in diameter than the diameter of the openings 14 in the basket wall 13. We do not wish to be confined to these measurements.

We provide novel means for forcing the glass cleaning and burnishing objects upwardly into the interior of the inverted glass and for permitting the trapped air in the glass to escape. In Figure 2 we show the drum or basket F provided with a centrally disposed and upwardly-extending spindle K. The lower end of the spindle is mounted in the base 9 of the drum F at 21. The spindle has a bore 22 that extends up to the top 23 of the spindle. A stopper L has a reduced portion 24 that snugly fits in the top of the bore 22 for holding the stopper in place. The enlarged head 25 of the stopper, see Figure 3, acts as a cushioning means when the bottom 26 of the inverted drinking glass is moved downward into the drum F.

The means for removing the trapped air in the inverted drinking glass comprises a plurality of openings 27 placed in the top of the spindle and these openings communicate with the bore 22. A second row of openings 28 are placed at the lower end of the spindle and communicate with the bore. When the inverted glass is moved downwardly into the drum F and over the spindle K, the trapped air in the glass will pass through the upper row of openings 27 into the bore 22 that is free of balls H, and then out from the lower row of openings 28 where the air will scape beyond the rim 29 of the drinking glass and bubble to the surface of the washing solution B.

The spindle K not only releases the trapped air from the interior of the inverted glass, but it also draws balls H up into the glass interior. This is accomplished by forming helical grooves 30 in the outer surface of the spindle that extend from end to end thereof. The grooves will force the glass-cleaning objects H upwardly into the interior of the glass for moving these objects against the entire inner surface of the glass for cleaning and polishing the latter. The width of the grooves 30 is such as to act as an auger when the spindle is rotated by the drum F, for moving the objects H upwardly into the glass interior toward the glass bottom.

Many glasses are provided with a curved annular portion shown at 31 in Figure 3. It is difficult to clean the concave interior surface 31a of this portion and it is also difficult to clean the convex exterior surface 31b. We have found that the objects H will conform to these irregular surfaces and will not only thoroughly wash them, but in addition will have a polishing and burnishing effect on the glass so as to remove all scratches that form on the glass surfaces due to contacting with other objects.

From the foregoing description of the various parts of the device, the operation thereof may be readily understood.

The motor D is connected to a source of current, not shown, and it will rotate the basket or drum F at a desired speed. The operator grasps a drinking glass and inverts it and then moves it downwardly into the rotating drum.

Even though the drum is practically filled with the glass-cleaning objects H, these objects will readily move away so as to permit the glass to be moved downwardly until the bottom of the glass rests upon the stopper L. Even the fingers of the operator can continue to hold the glass when the glass is entirely submerged in the glass-washing solution B. The rotation of the basket or drum F is slow enough so that the objects H will not cause any harm to the hand of the operator.

During the downward movement of the glass into the drum, the trapped air in the glass will be released through the bore 22 in the spindle K in the manner already described. The spindle will move the glass-cleaning objects against all surfaces on the inner side of the glass for cleaning these surfaces and polishing and burnishing them. The objects H on the outside of the glass will be forced against the outer surfaces of the glass for cleaning and burnishing the entire outer surface. The washing is quickly accomplished and all the operator need do is to move the glass downwardly into the rotating drum and hold it there for an instant of time and then remove the glass from the drum. During the immersion of the glass in the fluid, both interior and exterior surfaces are thoroughly cleaned, polished and even burnished by the objects H.

The auger grooves 30 on the spindle K not only lift the balls H to the top interior of the inverted glass, but thy also push the balls to the inner sides of the glass and create a rubbing motion that will clean the glass. The washing solution is preferably maintained at a temperature of 125° F. The ribs on the drum interior will move the balls in the basket against the outer surface of the glass.

The scratch marks on the glass will be burnished off. The mass of balls will conform to all glass shapes and will have a long life. Cups can also be washed and the objects H will not interfere unduly with the cup handle. Should a glass while being washed, accidentally slip out of the hand of the operator, it will not break because the drum is rotating slowly and the balls will act as cushioning means for the glass to protect it.

We claim:

1. In a drinking glass washing machine: a cup-shaped drum mounted for turning about a vertical axis; a rotatable spindle of substantially greater length than breadth disposed axially of the drum, and projecting upwardly from the bottom of the latter; the spindle having spiral grooves in its outer surface; a tank surrounding the drum, and being adapted to hold washing water therein; the drum being provided with perforations through which the water will pass from the tank into the drum; a plurality of individual glass-cleaning objects loosely contained in and substantially filling the drum; the spindle being unobstructed from above and dimensioned to have an inverted drinking glass or the like telescoped downwardly thereover into the mass of said objects so that the drinking glass will have its entire inner surface contacted by the objects as well as its outer surface; means for rotating the drum and the spindle; the grooves in the spindle being shaped for forcing those objects disposed within the glass upwardly and outwardly against the inner surface thereof with a rubbing and burnishing action for cleaning it, when the spindle is turned; the drum having a peripheral wall which will contain and rotate the objects about the glass when the drum is rotated for forcing the objects disposed outside of the glass, against the outer surface of the glass with a rubbing and burnishing action for cleaning the latter surface.

2. In a glass washing machine: a cup-shaped drum mounted for turning about a vertical axis; a rotatable spindle disposed axially of the drum, and projecting upwardly from the bottom of the latter; the spindle having spiral grooves in its outer surface; a tank surrounding the drum and being adapted to hold washing water; the drum being provided with perforations through which the water will pass from the tank into the drum; a cover having an annular flange surrounding the drum; this flange defining an opening larger than the drum to thereby provide an annular water-passageway space between the drum top and the flange; the cover further having inclined portions sloping downwardly to said opening; a plurality of individual glass-cleaning objects loosely contained in and substantially filling the drum; said objects being larger than the perforations in the drum and larger than said water-passageway space, whereby said objects cannot escape through said perforations or annular space; the spindle being unobstructed from above and dimensioned to have an inverted drinking glass or the like telescoped downwardly thereover into the mass of said objects so that the drinking glass will have its entire inner surface contacted by the objects as well as its outer surface; said inclined portions of the cover being disposed above the drum top to receive any of said objects displaced from the drum when the glass is moved into the drum; means for rotating the drum and the spindle; the grooves in the spindle being shaped for forcing those objects disposed within the inverted glass against the inner surface thereof for cleaning with a continuous rubbing and burnishing action, when the spindle is turned; the drum having a peripheral wall which will contain and rotate the objects about the glass when the drum is rotated for forcing the objects disposed outside of the glass, against the outer surface of the glass with a rubbing and burnishing action for cleaning the latter surface.

3. In a drinking glass washing machine: a cup-shaped drum mounted for turning about a vertical axis; a rotatable spindle of substantially greater length than breadth disposed axially of the drum, and projecting upwardly from the bottom of the latter; the spindle having spiral grooves in its outer surface; a tank surrounding the drum, and being adapted to hold washing water therein; the drum being provided with perforations through which the water will pass from the tank into the drum; a plurality of individual glass-cleaning objects loosely contained in and substantially filling the drum; the spindle being unobstructed from above and dimensioned to have an inverted drinking glass or the like telescoped downwardly thereover into the mass of said objects so that the drinking glass will have its entire inner surface contacted by the objects as well as its outer surface; means for rotating the drum and the spindle; the grooves in the spindle being shaped for forcing those objects disposed within the glass upwardly and outwardly against the inner surface thereof with a rubbing and burnishing action for cleaning it, when the spindle is turned; the drum having a peripheral wall; and means carried by said wall for forcing the objects disposed outside of the glass against the outer surface of the glass with a rubbing and burnishing action for cleaning the latter surface, when the drum is turned.

4. In a glass washing machine: a cup-shaped drum mounted for turning about a vertical axis; a rotatable spindle disposed axially of the drum, and projecting upwardly from the bottom of the latter; the spindle having spiral grooves in its outer surface; a tank surrounding the drum and being adapted to hold washing water; the drum being provided with perforations through which water will pass from the tank into the drum; a cover having an annular flange surrounding the drum; this flange defining an opening larger than the drum to thereby provide an annular water-passageway space between the drum top and the flange; the cover further having inclined portions sloping downwardly to said opening; a plurality of individual glass-cleaning objects loosely contained in and substantially filling the drum; said objects being larger than the perforations in the drum and larger than said water-passageway space, whereby said objects cannot escape through said perforations or annular space; the spindle being unobstructed from above and dimensioned to have an inverted drinking glass or the like telescoped downwardly thereover into the mass of said objects so that the drinking glass will have its entire inner surface contacted by the objects as well as its outer surface; said inclined portions of the cover being disposed above the drum top to receive any of said objects displaced from the drum when the glass is moved into the drum; means for rotating the drum and the spindle; the grooves in the spindle being shaped for forcing those objects disposed within the inverted glass against the inner surface thereof for cleaning with a continuous rubbing and burnishing action, when the spindle is turned; the drum having a peripheral wall; and inwardly-extending ribs carried by said wall for forcing the objects disposed outside of the glass against the outer surface thereof for cleaning the latter with a continuous rubbing and burnishing action when the drum is turned.

5. In a drinking glass washing machine: a drum mounted for turning about an upwardly-extending axis; a rotatable spindle disposed in the drum, and projecting upwardly from the bottom of the latter; a plurality of individual glass-cleaning objects loosely contained in the drum; the spindle being unobstructed from above and being dimensioned to have an inverted drinking glass, or the like, telescoped downwardly into the mass of the objects so that the glass will have its entire inner surface contacted by the objects as well as its outer surface; there being a sufficient mass of the objects in the drum to cover the exterior surface of the bottom of the inverted glass, when the interior surface of the bottom of the glass approaches the top of the spindle; and means for rotating the drum and the spindle; the spindle being shaped for rotating and forcing those objects disposed within the glass upwardly and outwardly against the inner surface thereof with a rubbing and burnishing action for cleaning it, when the spindle is turned; the drum having a peripheral wall which will contain and rotate the objects about the glass, when the drum is rotated, for forcing the objects disposed outside of the glass against the entire exterior surface of the glass including its bottom, with a rubbing and burnishing action for cleaning the entire exterior surface of the glass.

References Cited in the file of this patent

UNITED STATES PATENTS

| | | |
|---|---|---|
| 1,050,534 | Hant et al. | Jan. 14, 1913 |
| 1,826,942 | Mackres | Oct. 13, 1931 |
| 1,919,541 | Davis | July 25, 1933 |
| 1,964,429 | Eberts | June 26, 1934 |
| 2,153,238 | Cunningham | Apr. 4, 1939 |
| 2,158,904 | Meeker et al. | May 16, 1939 |
| 2,368,041 | Reilly | Jan. 23, 1945 |